US009124883B2

(12) United States Patent
Mao

(10) Patent No.: US 9,124,883 B2
(45) Date of Patent: Sep. 1, 2015

(54) 3D SHUTTER GLASSES SYNCHRONIZATION SIGNAL THROUGH STEREO HEADPHONE WIRES

(75) Inventor: Xiaodong Mao, Foster City, CA (US)

(73) Assignee: SONY COMPUTER ENTERTAINMENT, INC., Tokyo (JP)

( * ) Notice: Subject to any disclaimer, the term of this patent is extended or adjusted under 35 U.S.C. 154(b) by 334 days.

(21) Appl. No.: 13/281,792

(22) Filed: Oct. 26, 2011

(65) Prior Publication Data

US 2012/0120212 A1 May 17, 2012

Related U.S. Application Data

(60) Provisional application No. 61/414,869, filed on Nov. 17, 2010.

(51) Int. Cl.
*H04N 13/00* (2006.01)
*H04N 13/04* (2006.01)

(52) U.S. Cl.
CPC ...... *H04N 13/0438* (2013.01); *H04N 2213/008* (2013.01)

(58) Field of Classification Search
CPC .......... H04N 13/0438; H04N 13/0497; H04N 13/0422; H04N 13/0055; H04N 13/0425
USPC ...................... 348/56, 521, E13.04, E13.044, 348/E13.059; 398/106, 154
See application file for complete search history.

(56) References Cited

U.S. PATENT DOCUMENTS

| | | | | | |
|---|---|---|---|---|---|
| 4,967,268 | A | * | 10/1990 | Lipton et al. ...................... | 348/56 |
| 2011/0074919 | A1 | * | 3/2011 | Yoshifuji et al. ................ | 348/43 |
| 2012/0004919 | A1 | * | 1/2012 | Muth ............................ | 704/500 |
| 2012/0176485 | A1 | * | 7/2012 | Miyauchi et al. ............... | 348/56 |
| 2012/0194660 | A1 | * | 8/2012 | Nakamura et al. .............. | 348/56 |

FOREIGN PATENT DOCUMENTS

| | | |
|---|---|---|
| DE | 19533767 A1 | 3/1997 |
| JP | 9135400 A | 5/1997 |

* cited by examiner

*Primary Examiner* — Jay Patel
*Assistant Examiner* — Frank Huang
(74) *Attorney, Agent, or Firm* — Kilpatrick Townsend & Stockton LLP

(57) ABSTRACT

3D shutter glasses with a synchronization signal sent through a stereo headphone wire are presented. In some embodiments, the 3D shutter glasses receive a synchronization signal through the same wire that transmits audio data to headphones or other audio devices. The synchronization signal may be combined with the audio data through various techniques so as to not disrupt the audio a listener hears, but to still provide the data to the 3D shutter glasses to synchronize with a display.

17 Claims, 6 Drawing Sheets

3D SHUTTER GLASSES SYNCHRONIZATION SIGNAL THROUGH STEREO HEADPHONE WIRES

CROSS-REFERENCES TO RELATED APPLICATIONS

This application claims the benefit of U.S. Provisional Application No. 61/414,869, filed Nov. 17, 2010, which is hereby incorporated by reference in its entirety for all purposes.

BACKGROUND

1. Field of the Art

Embodiments of the present invention relate to electronic devices for viewing stereographic displays and, in particular, to actively shuttered three-dimensional ("3-D" or "3D") glasses synchronized in time with 3D enabled televisions.

2. Description of the Related Art

Televisions (TVs), monitors, and other displays have evolved over the years from black and white images to color, analog signals to digital high definition television (HDTV) formats, and cathode ray tube (CRT) screens to plasma and liquid crystal display (LCD) technologies. Three-dimensional ready televisions may be the next major upgrade that the general public endorses by buying in large quantities.

Three-dimensional ready televisions commonly incorporate stereoscopic displays. Stereoscopic displays present a separate image to a viewer's left eye and a separate image to the viewer's right eye. Technologies to present separate images to a viewer's eyes include anaglyphs, which typically use red and blue lens glasses, polarized lens glasses, and active shutter lens glasses for actively blocking the viewer's eyes in rapid, period sequence. All such lenses for 3D glasses are typically non-corrective lenses in that they do not redirect the direction of light (e.g., by refraction) as it passes through the lens.

For many 3D-ready televisions coming to market, their manufactures have developed vendor-unique protocols for viewing based on active shutter techniques. With active shutter techniques, a 3D television rapidly (e.g., 30 frames per second or greater) and alternatingly shows separate images for a viewer's left and right eyes. A viewer typically wears glasses that have liquid crystal (LC) active shutters rapidly blocking the left and right eye views alternatively so that each eye sees the corresponding left and right images shown at the corresponding time on the display. This "active shutter" process preferably is periodically and/or continuously synchronized with synchronization signals transmitted from the TV.

Currently, the synchronization signal is broadcasted from the TV wirelessly via a specialized transmitter in the television either built-in inside the TV front panel or external as peripheral, such as an infrared (IR) transmitter. The glasses typically comprise a specialized receiver to receive and analyze the wirelessly transmitted synchronization signal. This synchronization signal aligns the 3D glasses' lens timing to that of the television and corrects for wander in the 3D glasses' clock circuitry.

BRIEF SUMMARY

Generally, synchronizing stereoscopic content thought headphone wire(s) is disclosed. In particular, a device can be configured to display stereoscopic content intended for 3D glasses. The device may comprise an audio jack configured to transmit audio data through wire(s) to an audio device, such as a pair of headphones or earphones. A signal through the wire(s) may be received at a pair of 3D glasses configured to optimize and deliver the stereoscopic content to viewers of the stereoscopic content.

In some embodiments, the device may be a portable and/or handheld device. Particularly, the device may be a portable gaming console, such as a Playstation Portable (PSP). Using a portable and/or handheld device may be specifically advantageous because user's eyes and ears may be close enough to the device to use a wire to transmit data to the audio device and the 3D glasses more efficiently. The wire may carry a synchronization signal embedded within the audio data to the 3D glasses. A synchronization signal may be transmitted via the wire, also used to transmit audio data, to the glasses rather than through a wireless signal.

In an example embodiment, the synchronization signal is included in the audio data in a way that does not disrupt the audio experience of a user. For example, software in the portable device may phase shift the left and right audio channels slightly to embed the synchronization channel. The slight phase shift between the left and right channels may indicate whether the left or right eye should be viewing. Other modulation/demodulation techniques, such as amplitude-shift keying, frequency-shift keying and phase-shift keying may be used to embed the synchronization signal. The synchronization signal may also be encoded at a frequency beyond the normal range of human hearing. For example, the synchronization signal may be at a frequency above 15 or 20 kHz.

In another embodiment, the 3D glasses may include a pair of active shutter lenses, each lens enabled to alternate opacity and transparency, means for positioning the pair of lenses in front of a viewer's eyes, an input port configured to extract a synchronization signal from one or more audio data channels and a circuit operatively connected to the optical detectors and active shutter lenses, the circuit configured to synchronize alternating opacity and transparency of the lenses based on a synchronization signal from the a device using stereo headphone wires, in which the synchronization data indicates a shutter rate based on a frame rate of a stereoscopic display.

Some embodiments relate to a method for controlling active shutter lenses in three-dimensional glasses. The method includes receiving at least one audio channel having a synchronization signal that indicates a shutter speed based on a frame rate of a stereoscopic display, extracting the synchronization signal from the at least one audio channel, and synchronizing active shutter lenses in 3D glasses using the synchronization signal.

A further understanding of the nature and the advantages of the embodiments disclosed and suggested herein may be realized by reference to the remaining portions of the specification and the attached drawings.

DETAILED DESCRIPTION

Figure 1:
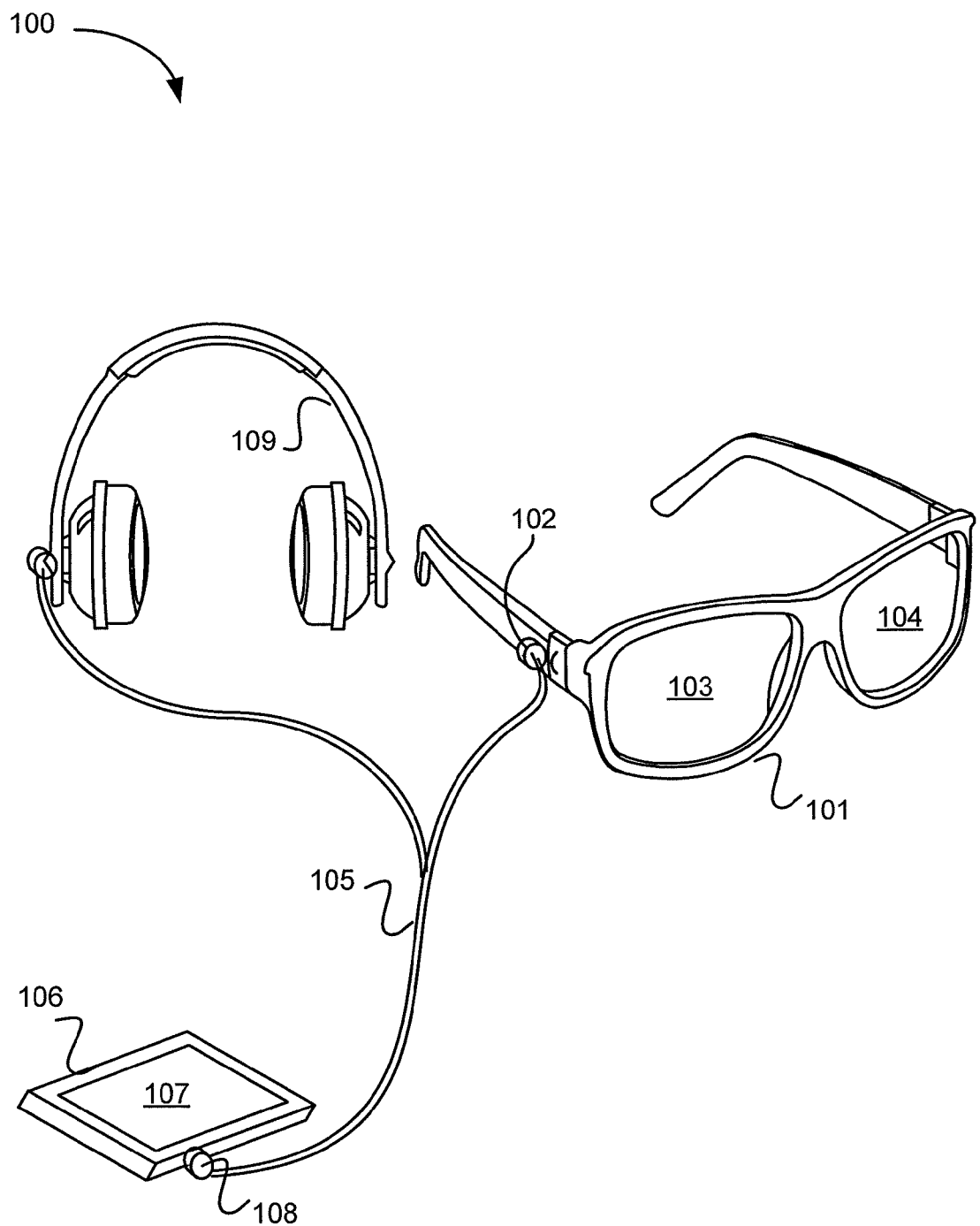
FIG. 1 illustrates a pair of 3D glasses with active shutter lenses receiving a synchronization signal through stereo headphone wires in accordance to an embodiment.

In general, systems, devices, and methods relating to 3D glasses with a synchronization signal sent through stereo headphone wires are presented. The 3D glasses may synchronize with a display of an otherwise 2D device by the synchronization signal though wires capable of carrying audio data signals, rather than a specialized transmitter for the device as is common in the prior art.

The otherwise 2D device is "Not a 3D enabled" device. "Not 3D enabled" devices include devices that are not equipped with a synchronization transmitter for active shutter glasses, such as an IR transmitter. The otherwise 2D device may comprise an audio interface and a display capable of presenting a series of frames to a user or capable of supporting active shutter images. For example, the otherwise 2D device may be a television, a handheld device with a viewing section, a monitor, a mobile phone, a smartphone, a portable gaming system.

The 3D glasses may comprise liquid crystal lenses that shutter in harmony with the device display to produce a stereoscopic image to the user. The glasses can synchronize with the display by analyzing the synchronization signal received from the device as its display alternates between the frames intended for the right eye and the left eye of a viewer. The display may continuously alternate between the left eye and right eye views to support an active shutter system. As the display transitions between respective frames, the synchronization signal indicates the transition and transition rate of alternating frames. The synchronization signal analysis causes the 3D glasses to be synchronized with the display of the device to produce a stereoscopic image for the user. The glasses and the portable device may synchronize through a synchronization signal.

3D glasses in accordance with an embodiment may be comprised of one or more input ports. The input port (e.g., audio interface supporting a traditional headphone jack) may be configured to receive the synchronization signal using headphone wire(s). The input port may be placed at various locations on the 3D glasses. For example, the input port may be placed on the glasses frame, along the front of the glasses, along the arm of the glasses, or placed on any other integrated component. In case that more than one input port is used, the input ports may be clustered near each other, or they may be spread out and may face different angles and/or directions.

The input port may receive a synchronization signal from a device. Advantageously, almost all of consumer electronics having a display with sufficiently high refresh rates and an audio interface (e.g., audio interface compatible with standard 2.5 mm and 3.5 mm audio jacks) may be used to produce stereoscopic content for the viewer using the 3D glasses. The refresh rate of the device is sufficiently high (e.g., 120 Hz) to allow for proper transition of alternating frames of the source material to provide the viewer with the best stereoscopic quality. The device may comprise a software application and/or circuitry in accordance to some embodiments. The software application, which is loaded on the device, and/or circuitry alternates right and left views of a 3D scene rapidly (e.g., at 60, 120 Hz) on its display.

In some embodiments, the 3D glasses receive the synchronization signal through the input port using wires capable of carrying audio signals, such as stereo headphone wire(s). The synchronization signal is transmitted from an output port (e.g., audio interface supporting a traditional headphone jack) of the device and received at the input port of the 3D glasses using the wire. Using a "Y" wire with proper connectors allows for connecting the device to both the 3D glasses and a pair of headphones. It should be noted that any electroacoustic transducer that produces sound in response to an electrical audio signal input, such as a loudspeaker or earphones, may be used alternatively in place of the pair of headphones.

In some instances, the synchronization signal may be received as an embedded signal. The wire(s) may transfer a combination of the synchronization signal and the audio signal in a way that does not disrupt the listening experience a user while the synchronization signal and an audio signal may be sent to both the glasses and headphones in accordance to some embodiments. For example, the software application residing on the device modulates a 3D synchronization signal with audio data channel so that the 3D glasses can synchronize themselves off of the audio left/right signals on the headphones wire. This way, less wire conductors are used for wired synchronization signals and less components are used for infrared synchronizing of conventional 3D glasses.

Various modulation/demodulation techniques known in the art may be used to embed and extract the synchronization signal from audio data channels. In some instances, the synchronization signal may be embedded within the audio data by phase shifting the left and right audio channels. In other embodiment, keying technique may be used. Keying modulation technique may be used to embed the synchronization signal. Keying may be characterized by having a limited number of states (i.e., values) defined for the modulating signal, for example the audio data, to represent the corresponding states of embedded signal, for example the synchronization signal. Keying may include amplitude-shift keying, frequency-shift keying, and phase-shift keying may be used to embed and extract the synchronization signal from audio channels. In another embodiment, the synchronization channel may also be broadcasted at a frequency below or beyond the range of human audible range. For example, the signal may be broadcasted at beyond 15 or 20 kHz. Other forms of analog and digital modulation may also be used to embed the synchronization signal.

After extraction of the synchronization signal, the synchronization signal may then be analyzed to determine the shutter transition rate and speed on the 3D glasses so as to block the view of the currently unblocked eye and to unblock the view of the currently blocked eye when a transition is inferred from the synchronization signal analysis data. Thus the shutter rate may match the display frame rate based on the information analyzed from the extracted synchronization signal.

3D glasses in accordance with an embodiment may be comprised of one or more output ports (e.g., audio interface compatible with standard headphone audio jack). The output port may be configured to output the synchronization signal using headphone wire(s). For example, the output port may be configured to output one or more audio data channels received from the device. The output port may be placed at various locations on the 3D glasses. For example, the output port may be placed on the glasses frame, along the front of the glasses, along the arm of the glasses, or placed on any other integrated component. In the case that more than one output port is used, the output ports may be clustered near each other, or they may be spread out and may face different angles and/or directions. Additionally, the output port may output the received signal, such as a combined audio signal and embedded synchronization signal, prior to any extraction and analysis of the received signal by the 3D glasses.

In an example embodiment, additional components may be integrated to the 3D glasses. For example, the 3D glasses may include one or more earphones. One or more earphones may be attached to different parts of the 3D glasses, such as an aim of the 3D glasses. In the case that one or more earphones are included in the 3D glasses, the audio data received with the synchronization signal may be routed to the included one or more earphones so that the viewer can experience the stereoscopic content displayed by the device along with the audio data received from the device using stereo headphones wire(s).

According to some exemplary embodiments, an apparatus is presented that may be comprised of the 3D glasses, one or more earphones, and one or more wires for viewing 3D content for viewing stereoscopic content from a 2D display. According to some embodiments, the one or more audio devices may be any electroacoustic transducer that produces sound in response to an electrical audio signal input, such as a loudspeaker or earphone, or a pair of headphones. In other embodiments, the one or more wires may be any medium capable of carrying an audio signal, such as speaker wires, computer speaker wires, or headphone wires.

FIG. 1 illustrates a pair of 3D shutter glasses receiving synchronization signal through stereo headphone wires according to an embodiment. Overall system 100 includes 3D shutter glasses 101, a wire 105, a device 106, and an audio device 107

Glasses 101 may be comprised of input port 102, right lens 103, and left lens 104. Although only one input port is shown, there could be any number of input ports 102 at any location on the glasses 101. The glasses 101 may be active shutter glasses. The glasses 101 may comprise of liquid crystal lenses 103 and 104 that may alternate between opaque and transparent states. The glasses 101 may be comprised of circuitry or software to analyze the audio data and derive the synchronization signal. The synchronization signal may then be used to control the shutter rate of the lenses.

Device 106 may comprise a display 107 and an output port 108. Device 106 may display images through the display 107 to present a series of frames to a user or capable of supporting active shutter images. According to an exemplary embodiment, the output port 108 may be an audio interface that a traditional headphone audio jack (e.g., a TRS connector) or other audio device 109 may plug into.

In some embodiments, display 107 has no special synchronization transmitter(s) for 3D glasses and is not marketed as a 3D-capable display. For example, an old progressively-scanned (as opposed to interlaced) television with a relatively high frame rate can be used. It can be hooked up to a digital versatile disc (DVD) player. A DVD can play a 3D movie that has alternating left and right images, which show on the display. A pair of 3D glasses in accordance with an embodiment can synchronize with the content on the display as it was meant to be viewed. Thus, a user can use an embodiment of the glasses to watch a 3D movie on an old television.

The wire 105 may carry the synchronization signal from the device 106 to both the audio device 109 and the glasses 101. The synchronization signal may be analyzed by the glasses 101 to synchronize with the display 107 so that a stereoscopic image is produced to a user when wearing the glasses 101 and looking at the display 108.

Audio device 109 may be a loudspeaker, computer speaker, a pair of headphones, or any device capable of producing sound from an audio data signal. In an exemplary embodiment, the audio device 109 may not do any processing, such as removing the synchronization signal, before outputting the audio signal to a user. Thus, the synchronization signal may be embedded within the audio signal in a manner that does not disrupt the listening experience of the user.

Figure 2:
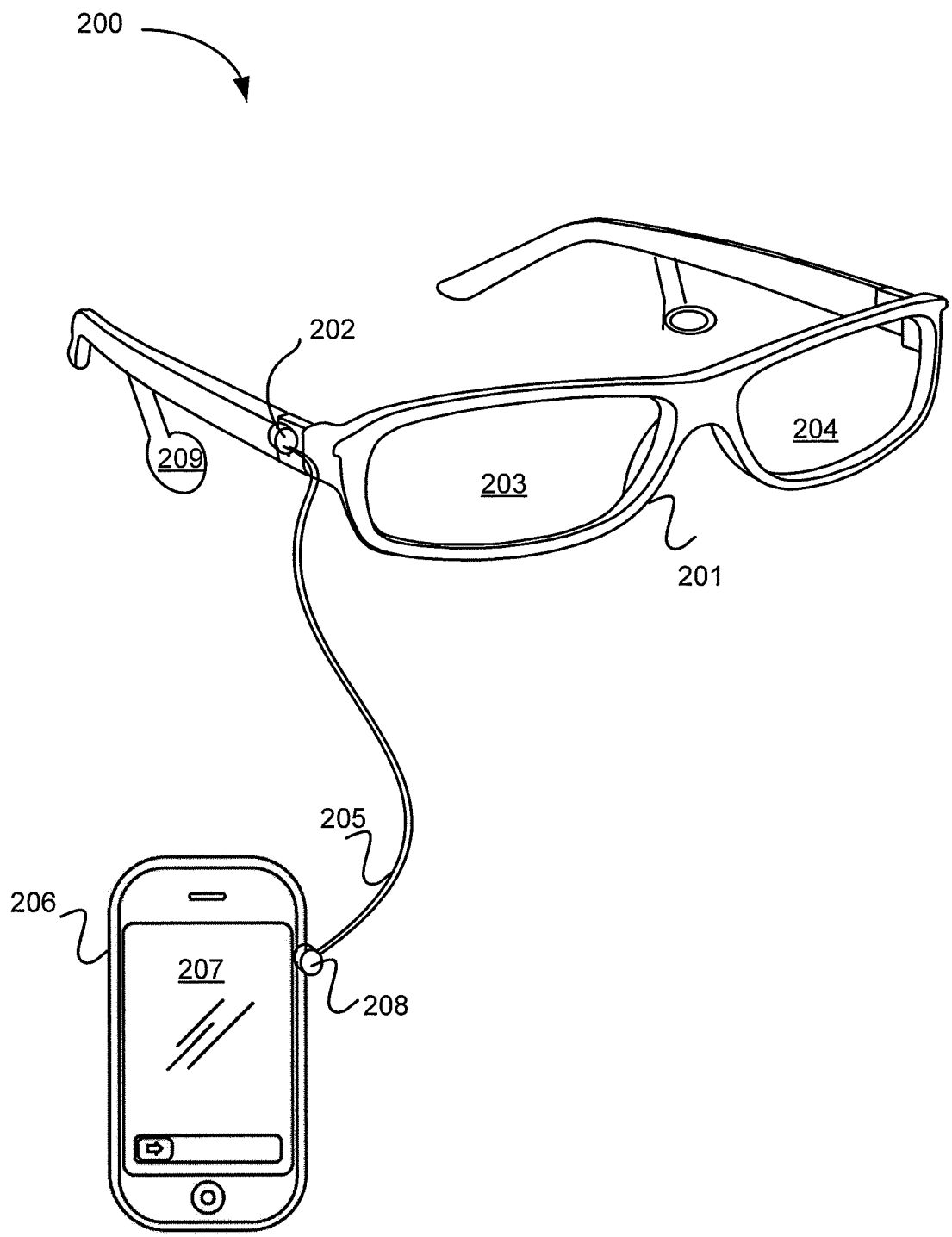
FIG. 2 illustrates a pair of 3D glasses with active shutter lenses and integrated earphones receiving a synchronization signal through stereo headphone wires in accordance with an embodiment.

FIG. 2 illustrates a 3D shutter glasses with an integrated audio device receiving a synchronization signal through stereo headphone wires in accordance with an embodiment. 3D glasses 201 have audio device 209 (e.g., a pair of earphones) mounted on its frame. The audio device 209 may be oriented at a different angles and may be placed on different locations of the 3D glasses 201. In an embodiment, the audio data is received and routed to the audio device by the 3D glasses 201. In some instances, multiple input ports 202 and circuitry and/or software applications (not shown) may be used to route and analyze the audio channel for the audio data to audio device 209.

Figure 3:
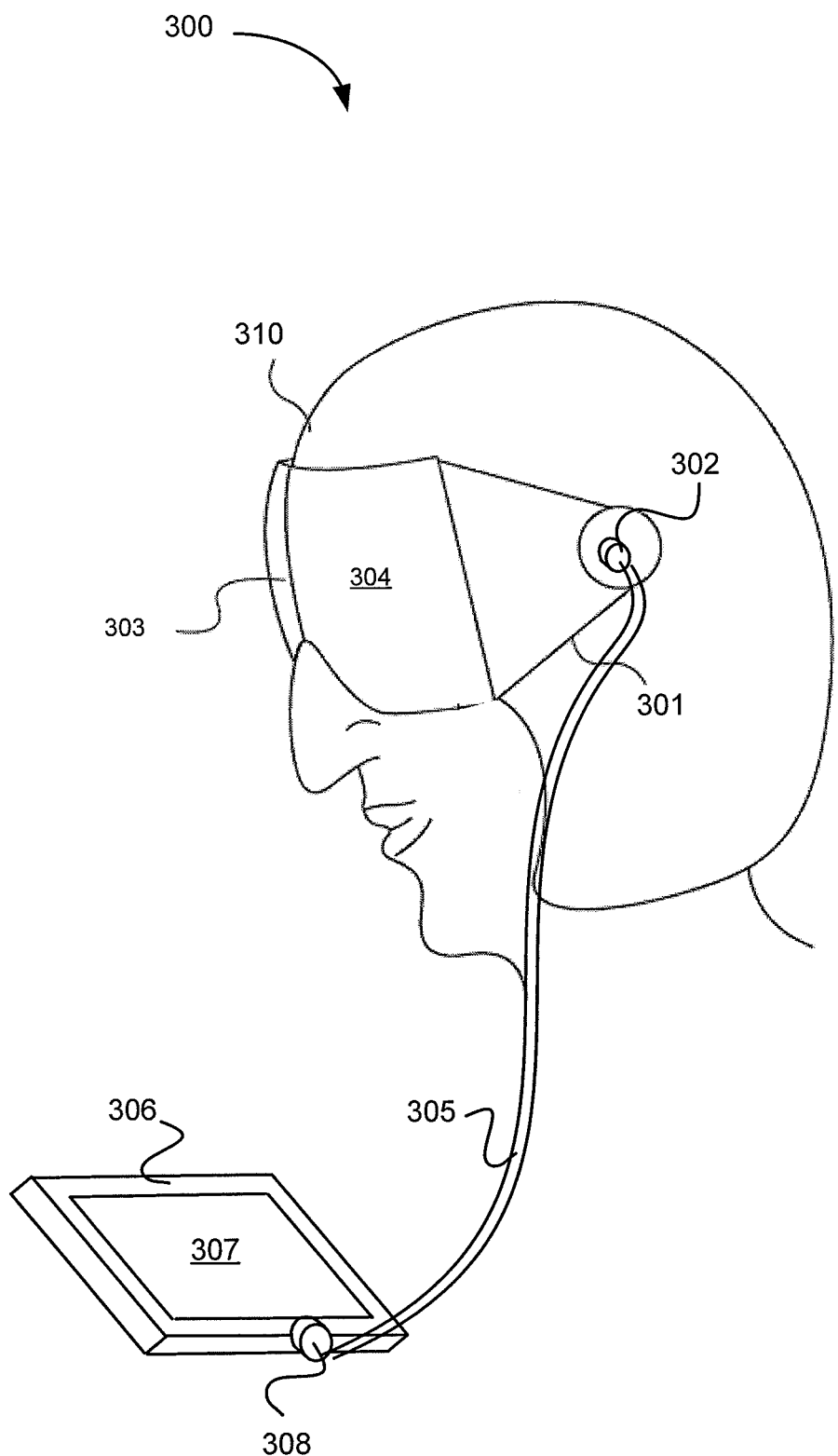
FIG. 3 illustrates a helmet and goggles with active shutter lenses receiving a synchronization signal through stereo headphone wires in accordance with an embodiment.

FIG. 3 illustrates a helmet and goggles with active shutter lenses in accordance with an embodiment. Helmet 310 has an input port 302 and visor/goggles 301 with active shutter lenses 303 and 304. An audio device (not shown in figure) is integrated into the helmet and visor. In this embodiment, input port 302 receives the synchronization signal from portable device 306 via wire 305.

Figure 4:
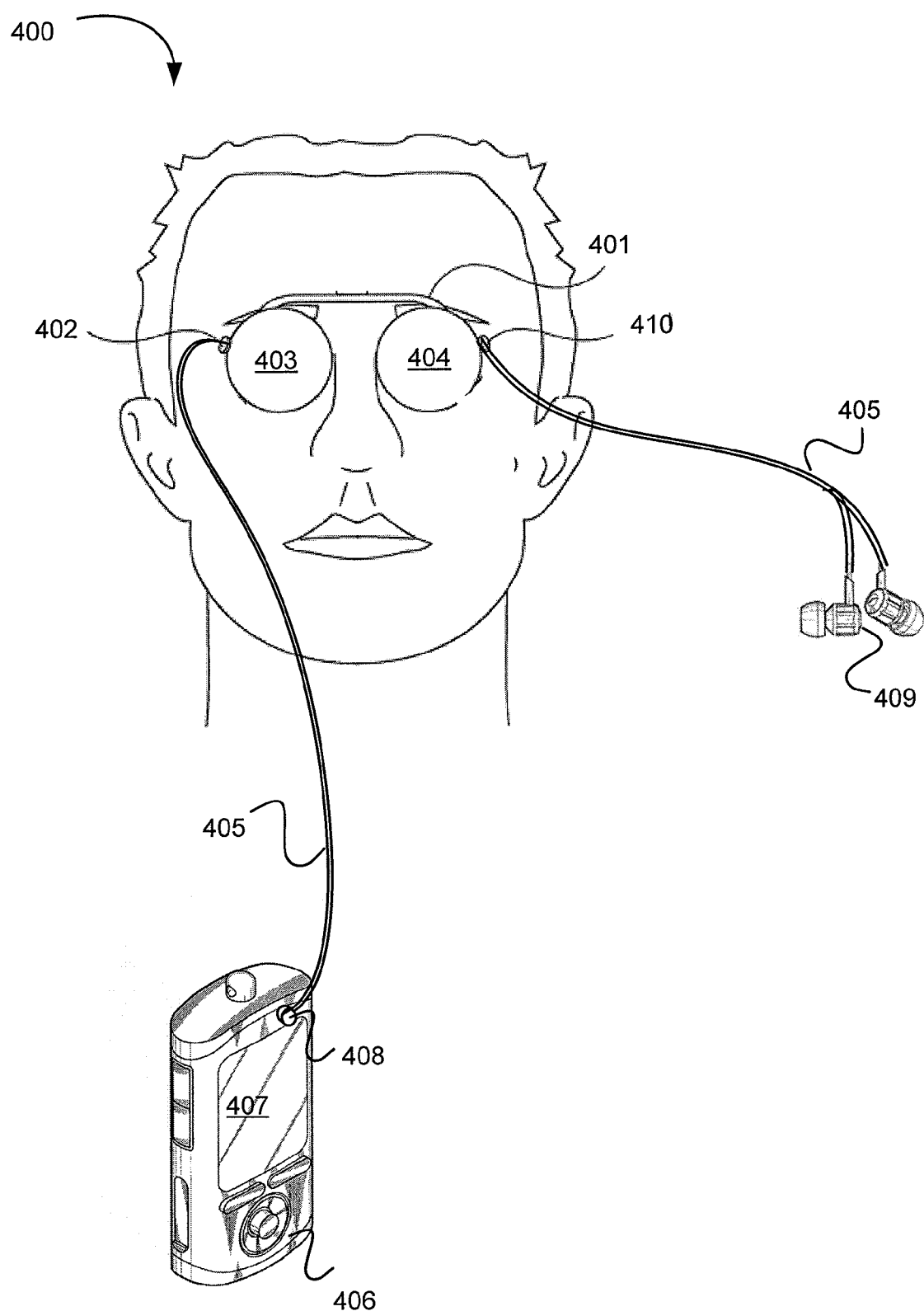
FIG. 4 illustrates pince-nez with active shutter lenses receiving a synchronization signal through stereo headphone wires in accordance with an embodiment.

FIG. 4 illustrates minimalist pince-nez 401 with input port 402 and active shutter lenses 403 and 404. In the exemplary embodiment, one or more output ports 410 may be mounted on the lenses and/or bridge piece of pince-nez 401 to output audio data to audio device 409. Spectacles, pince-nez, monocles, binoculars, contact lenses, and other means for a wearer to don a lens or lenses in front of his or her eyes are contemplated. In addition, a stand with a pair of lenses placed at eye level, such as for a demonstration, is also contemplated. Lenses may wrap around the sides of a user's face or be minimalist, mounted just in front of the user's eyes.

Figure 5:
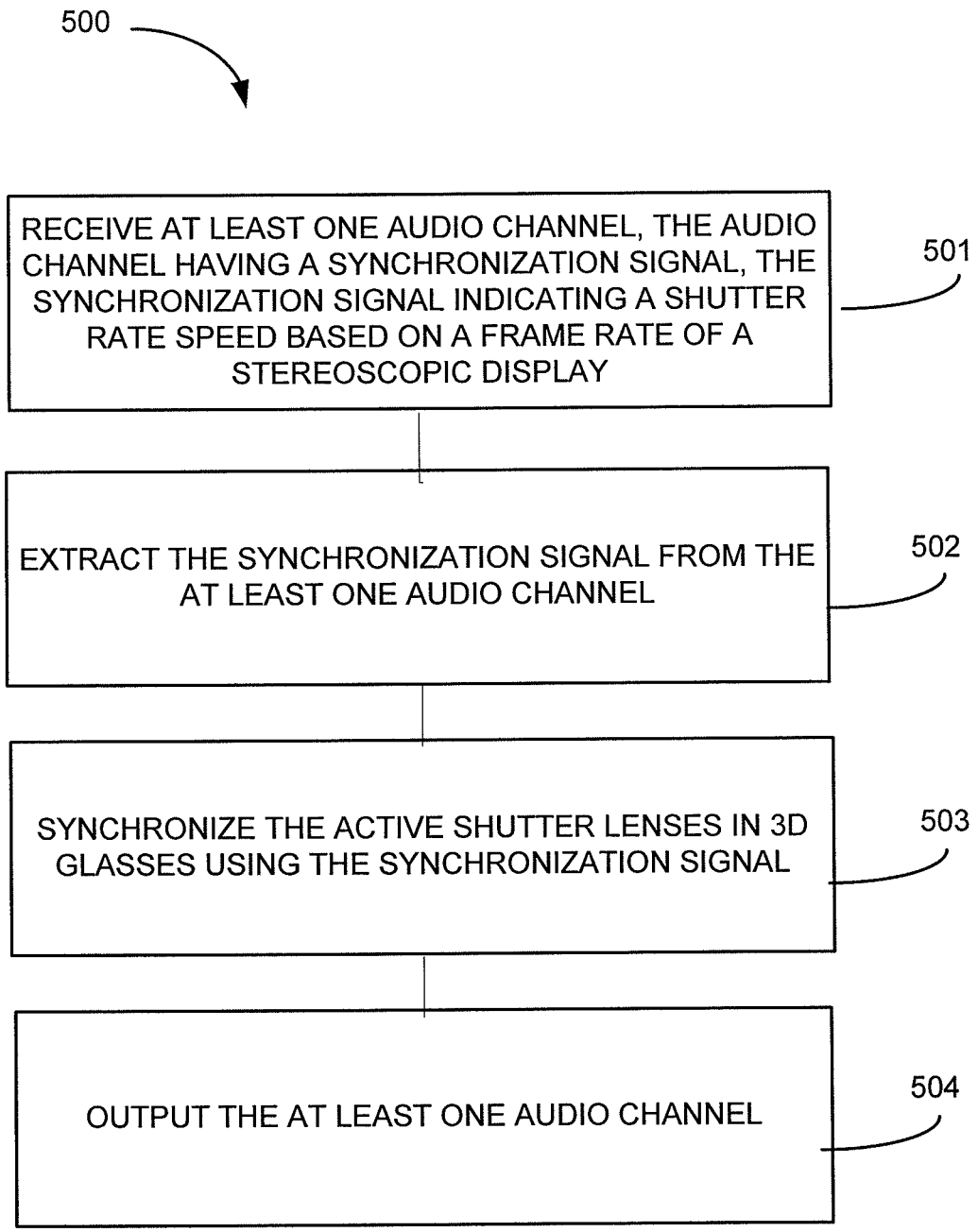
FIG. 5 illustrates a flowchart of a process in accordance with an embodiment.

FIG. 5 is a flowchart illustrating process 500 in accordance with one embodiment. In operation 501, one or more audio channel is received, the audio channel having a synchronization signal that indicates a shutter speed based on a frame rate of a stereoscopic display. In operation 502, the synchronization signal is extracted from a signal that is a combination of one or more audio channels and the synchronization signal. In operation 503, the active shutter lenses are synchronized using the extracted synchronization signal. In operation 504, the audio channels(s) received at the input port is outputted using one or more output ports.

The operations may be performed in the sequence given above or in different orders as applicable. They can be automated in a computer or other machine and can be coded in software, firmware, or hard coded as machine-readable instructions and run through one or more processors that can implement the instructions.

Figure 6:
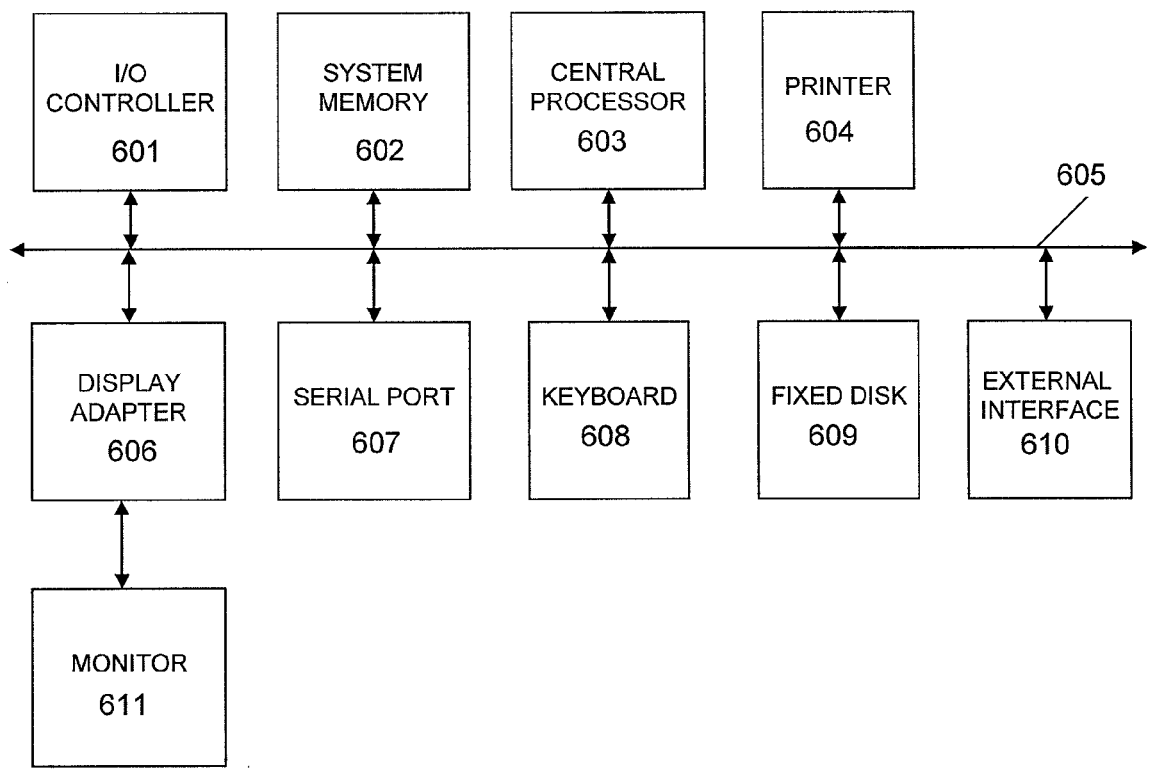
FIG. 6 illustrates a computer system in accordance with an embodiment.

FIG. 6 is a computer system according to an example embodiment. The various participants and elements in the previously described system diagrams (e.g., glasses, portable device in FIG. 1) may use any suitable number of subsystems in the computer apparatus to facilitate the functions described herein. Examples of such subsystems or components are shown in FIG. 6. The subsystems shown in FIG. 6 are interconnected via a system bus 605. Additional subsystems such as a printer 604, keyboard 608, fixed disk 609 (or other memory comprising computer-readable media), monitor 611, which is coupled to display adapter 606, and others are shown. Peripherals and input/output (I/O) devices, which couple to I/O controller 601, can be connected to the computer system by any number of means known in the art, such as serial port 607. For example, serial port 607 or external interface 610 can be used to connect the computer apparatus to a wide area network such as the Internet, a mouse input device, or a scanner. The interconnection via system bus allows the central processor 603 to communicate with each subsystem and to control the execution of instructions from system memory 602 or the fixed disk 609, as well as the exchange of information between subsystems. The system memory 602 and/or the fixed disk 609 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention

What is claimed is:

1. An apparatus for viewing three-dimensional (3D) objects on a display, comprising:
a pair of active shutter lenses, each lens enabled to alternate opacity and transparency;
means for positioning the pair of active shutter lenses in front of a viewer's eyes;
an input port configured to receive one or more audio signals over one or more audio channels, the one or more audio signals having an embedded shutter synchronization signal, the embedded shutter synchronization signal indicating a shutter transition rate based on a display transition rate of stereoscopic images on the display, wherein the embedded shutter synchronization signal is received using a modulated signal created from a signal modulation process, wherein the one or more audio signals are phase shifted to embed the synchronization signals, and wherein the shutter synchronization signal is encoded at a frequency beyond human audible range;
a circuit operatively connected to the input port and the pair of active shutter lenses, the circuit configured to extract the shutter synchronization signal from the one or more audio signals and to synchronize alternating opacity and transparency of the lenses using the extracted shutter synchronization signal as extracted, wherein extracting the shutter synchronization signal includes demodulating the modulated signal; and an audio device configured to receive the one or more audio signals over the one or more audio channels and output the audio signals as received, wherein the audio device is operatively connected to at least one of the means for positioning the pair of lenses, the pair of active shutter lenses, the circuit, and the input port, and wherein the embedded synchronization signal is included in the audio signal in a way that does not disrupt an audio experience of a user.

2. The apparatus of claim 1, wherein the shutter synchronization signal is received by the input port using a wire.

3. The apparatus of claim 1, wherein the means for positioning the pair of lenses includes a frame.

4. The apparatus of claim 3 wherein the input port is connected to the frame.

5. The apparatus of claim 1 further comprising:

an output port configured to output the one or more audio channels.

6. A method for controlling active shutter lenses in three-dimensional (3D) glasses, the method comprising:

receiving at least one audio signal over at least one audio channel, the audio signal having an embedded shutter synchronization signal, the embedded shutter synchronization signal indicating a shutter transition rate based on a display transition rate of stereoscopic images on the display, wherein the embedded shutter synchronization signal is received using a modulated signal created from a signal modulation process, wherein the at least one audio signal is phase shifted to embed the synchronization signal, and wherein the shutter synchronization signal is encoded at a frequency beyond human audible range;

extracting the shutter synchronization signal from the at least one audio signal, wherein extracting the shutter synchronization signal includes demodulating the modulated signal;

synchronizing the active shutter lenses in 3D glasses using the shutter synchronization signal as extracted; and receiving at an audio device operatively connected to the 3D glasses, the at least one audio signal over the at least one audio channel and outputting the at least one audio signal as received wherein the embedded synchronization signal is included in the at least one audio signal in a way that does not disrupt an audio experience of a user.

7. The method of claim 6, wherein the extracting is performed by at least one of:

a circuit; and a software program.

8. A system for viewing three-dimensional (3D) objects on a display, the system comprising:

a first apparatus having a display and an output port, the output port configured to output at least one audio signal over at least one audio channel;

a second apparatus operatively connected to the first apparatus, the second apparatus comprising an input port and a pair of active shutter lenses configured to alternate opacity and transparency, the second apparatus configured to receive the at least one audio signal over the at least one audio channel and synchronize alternating opacity and transparency of the lenses with stereoscopic images on the display based on a shutter synchronization signal embedded in the at least one audio signal, the shutter synchronization signal as extracted from the at least one audio signal indicating a shutter transition rate based on a display transition rate of stereoscopic images on the display, wherein the embedded shutter synchronization signal is received using a modulated signal created from a signal modulation process, wherein the at least one audio signal is phase shifted to embed the synchronization signal, wherein the embedded shutter synchronization signal is encoded at a frequency beyond human audible range, and wherein extracting the shutter synchronization signal includes demodulating the modulated signal; and a third apparatus operatively coupled to the second apparatus, the third apparatus configured to receive the one or more audio signals over the one or more audio channels and output the audio signals as received wherein the embedded synchronization signal is included in the one or more audio data signals in a way that does not disrupt an audio experience of a user.

9. The system of claim 8, wherein the first apparatus is a portable gaming console not otherwise equipped for displaying three-dimensional (3D) images.

10. The system of claim 8 further comprising machine-readable instructions on a non-transitory tangible storage medium, the instructions configured to cause a processor of the first apparatus to display alternating left and right images on the display and embed a shutter synchronization signal in at least one audio channel, such that an audio interface on the first apparatus can be used for 3D glasses synchronization.

11. The apparatus of claim 1 wherein the shutter synchronization signal is received by the input port using a Y connector.

12. The apparatus of claim 1, wherein the means for positioning the pair of lenses includes a helmet.

13. The apparatus of claim 1, wherein the audio device may be oriented at different angles and placed at different locations on at least one of the means for positioning the pair of lenses, the pair of active shutter lenses, the circuit, and the input port.

14. The apparatus of claim 1, wherein the audio device comprises a loudspeaker.

15. The apparatus of claim 1, wherein the audio device comprises a pair of headphones.

16. The apparatus of claim 1, wherein the shutter transition rate matches the display transition rate.

17. The apparatus of claim 1, wherein the shutter synchronization signal is broadcast at a frequency above 15 kHz.

* * * * *